United States Patent
Ohguchi et al.

(10) Patent No.: US 7,701,810 B2
(45) Date of Patent: *Apr. 20, 2010

(54) REPRODUCTION APPARATUS, REPRODUCTION METHOD AND REPRODUCTION PROGRAM

(75) Inventors: Nobuhiko Ohguchi, Tokyo (JP); Atsushi Ishihara, Tokyo (JP)

(73) Assignee: Sony Corporation, Tokyo (JP)

( * ) Notice: Subject to any disclaimer, the term of this patent is extended or adjusted under 35 U.S.C. 154(b) by 864 days.

This patent is subject to a terminal disclaimer.

(21) Appl. No.: 11/512,324

(22) Filed: Aug. 30, 2006

(65) Prior Publication Data

US 2007/0053247 A1    Mar. 8, 2007

(30) Foreign Application Priority Data

Aug. 31, 2005    (JP) .............................. 2005-252693

(51) Int. Cl.
*G11B 7/085* (2006.01)
*G11B 5/09* (2006.01)
(52) U.S. Cl. ............... 369/30.04; 369/47.3; 369/47.36; 369/53.44; 369/59.14
(58) Field of Classification Search ............... 369/47.3, 369/47.36, 53.44, 59.14, 30.04, 30.08
See application file for complete search history.

(56) References Cited

U.S. PATENT DOCUMENTS 6,289,265 B1 * 9/2001 Takenaka et al. ............ 700/245
6,377,530 B1 * 4/2002 Burrows ................... 369/59.21
6,721,490 B1 * 4/2004 Yao et al. ...................... 386/69
2007/0047397 A1 * 3/2007 Ohguchi et al. .......... 369/30.08

FOREIGN PATENT DOCUMENTS

| JP | 62-219387 | 9/1987 |
| JP | 3-30175 | 2/1991 |
| JP | 11-232847 | 8/1999 |
| JP | 2002-358726 | 12/2002 |
| JP | 2003-317451 | 11/2003 |
| JP | 2005-122890 | 5/2005 |
| WO | WO 02/48917 A1 | 6/2002 |

OTHER PUBLICATIONS

U.S. Appl. No. 11/496,916, filed Aug. 1, 2006.
U.S. Appl. No. 11/494,233, filed Jul. 27, 2006.
U.S. Appl. No. 11/429,878, filed May 8, 2006.
U.S. Appl. No. 11/509,727, filed Aug. 25, 2006, Ohguchi, et al.

* cited by examiner

*Primary Examiner*—Ali Neyzari
(74) *Attorney, Agent, or Firm*—Oblon, Spivak, McClelland, Maier & Neustadt, L.L.P.

(57) ABSTRACT

A reproduction apparatus includes a storage part which stores a plurality of items of contents data; reproduction means for reproducing contents in any one of reproduction modes including a normal reproduction mode that reads the contents data stored in the storage part in a predetermined order for reproduction, and a recommend mode that selects one part of the contents data stored in the storage part as a recommended piece of music for reproduction; and reproduction mode control means for changing the reproduction mode in the reproduction means to the recommend mode when a predetermined recommend mode changing condition is satisfied.

7 Claims, 11 Drawing Sheets

REPRODUCTION APPARATUS, REPRODUCTION METHOD AND REPRODUCTION PROGRAM

CROSS REFERENCES TO RELATED APPLICATIONS

The present invention contains subject matter related to Japanese Patent Application JP 2005-252693 filed in the Japanese Patent Office on Aug. 31, 2005, the entire contents of which being incorporated herein by reference.

BACKGROUND OF THE INVENTION

1. Field of the Invention

The present invention relates to a reproduction apparatus, a reproduction method and a reproduction program, which are preferably adapted to a music reproduction apparatus that plays music based on music data.

2. Description of the Related Art

In recent years, a portable music reproduction apparatus is widely available which records music data on a nonvolatile memory, a hard disk drive or other devices (for example, see JP-A-2003-85888).

This type of music reproduction apparatus has reproduction modes of music data, including a normal reproduction mode that reproduces pieces of recorded music in recorded order, and a random music reproduction mode that randomly reproduces music, and some pieces of the apparatus further have a so-called recommend mode that selects and reproduces a piece of music which a user might be prefer as a recommended piece of music among the pieces of music recorded based on user's preferences and the frequency of reproduction.

SUMMARY OF THE INVENTION

However, in the music reproduction apparatus before, it is configured to switch the reproduction modes by a user manually, causing a problem that the manipulation is complicated.

It is desirable to provide a reproduction apparatus, a reproduction method and a reproduction program which can reproduce music with significantly improved entertainment value more than before.

In view of the above, an embodiment of the invention provides a reproduction apparatus having: a storage part which stores a plurality of items of contents data; reproduction means for reproducing contents in any one of reproduction modes including a normal reproduction mode that reads the contents data stored in the storage part in a predetermined order for reproduction, and a recommend mode that selects one part of the contents data stored in the storage part as a recommended piece of music for reproduction; and reproduction mode control means for changing the reproduction mode in the reproduction means to the recommend mode when a predetermined recommend mode changing condition is satisfied.

Therefore, the reproduction apparatus is configured to change the mode to the recommend mode depending on the recommend mode changing condition satisfied. Thus, the apparatus can automatically change the reproduction mode depending on the conditions not by user's manipulation, and can create an impression to a user as though it changes the mode at its intention. Accordingly, the apparatus can perform reproduction with a significantly improved entertainment value more than before.

In addition, a reproduction method according to an embodiment of the invention is a reproduction method having the steps of: reproducing contents in any one of reproduction modes including a normal reproduction mode that reads the contents data stored in a storage part in a predetermined order for reproduction, and a recommend mode that selects one part of the contents data stored in the storage part as a recommended piece of music for reproduction; and changing the reproduction mode in the reproducing step to the recommend mode when a predetermined recommend mode changing condition is satisfied.

Therefore, the reproduction method is configured to change the mode to the recommend mode depending on the recommend mode changing condition satisfied. Thus, the method can automatically change the reproduction mode depending on the conditions not by user's manipulation, and can create an impression to a user as though it changes the mode at its intention. Accordingly, the method can perform reproduction with a significantly improved entertainment value more than before.

In addition, a reproduction program according to an embodiment of the invention is a reproduction program which allows a reproduction apparatus to perform steps, the program having the steps of: reproducing contents in any one of reproduction modes including a normal reproduction mode that reads the contents data stored in a storage part in a predetermined order for reproduction, and a recommend mode that selects one part of the contents data stored in the storage part as a recommended piece of music for reproduction; and changing the reproduction mode in the reproducing step to the recommend mode when a predetermined recommend mode changing condition is satisfied.

Therefore, the reproduction program is configured to change the mode to the recommend mode depending on the recommend mode changing condition satisfied. Thus, the program can automatically change the reproduction mode depending on the conditions not by user's manipulation, and can create an impression to a user as though it changes the mode at its intention. Accordingly, the program can perform reproduction with a significantly improved entertainment value more than before.

According to an embodiment of the invention, it is configured to automatically change the mode to the recommend mode that selects one part of the contents data stored in the storage part as a recommended piece of music for reproduction depending on the recommend mode changing condition satisfied, whereby the reproduction mode can be automatically changed depending on the conditions not by user's manipulation, and an impression can be created to a user as though it changes the mode at its intention. Accordingly, a reproduction apparatus, a reproduction method and a reproduction program can be implemented which can perform reproduction with a significantly improved entertainment value more than before.

DETAILED DESCRIPTION OF THE INVENTION

Hereinafter, an embodiment of the invention will be described in detail with reference to the drawings.

1. Configuration of Music Reproduction Robot Apparatus

Figure 1A:
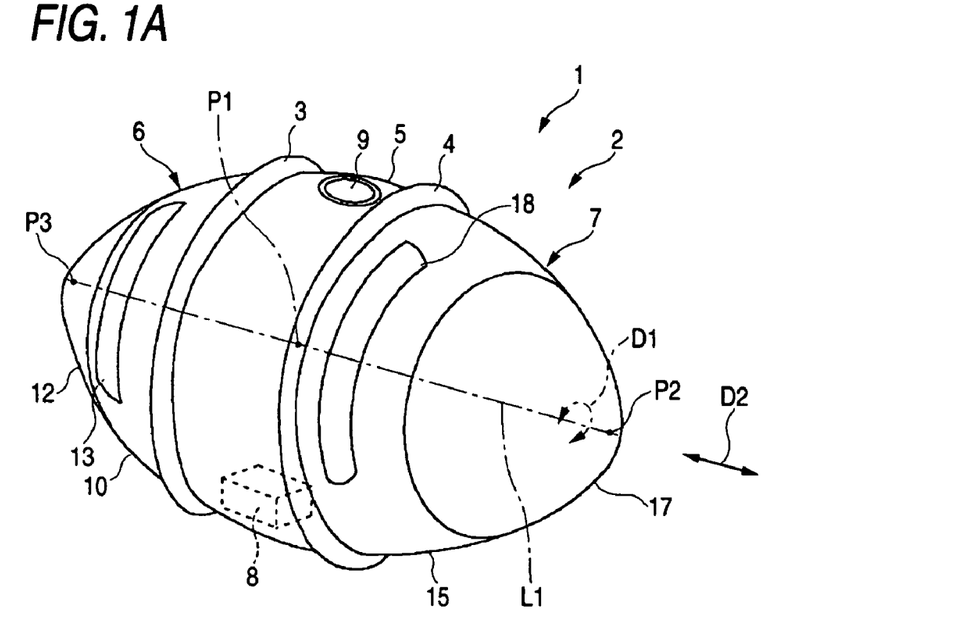
FIGS. 1A and 1B show a schematic diagram depicting the appearance configuration of a music reproduction robot apparatus according to an embodiment.
Figure 1B:
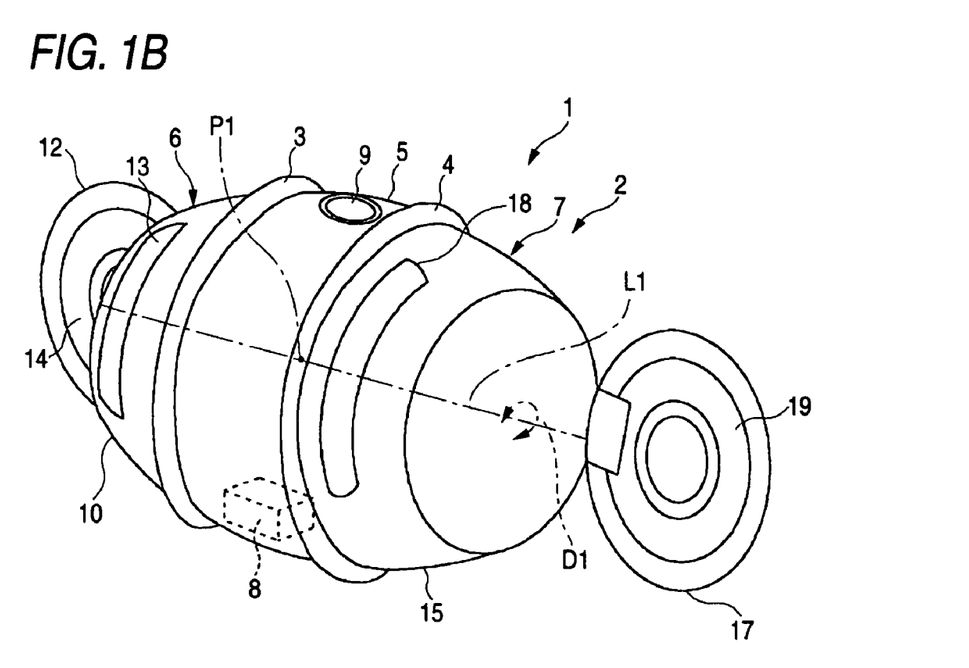

In FIGS. 1A and 1B, 1 generally denotes a music reproduction robot apparatus having an ellipsoidal case 2 in a rotating ellipsoidal shape.

Figure 2:
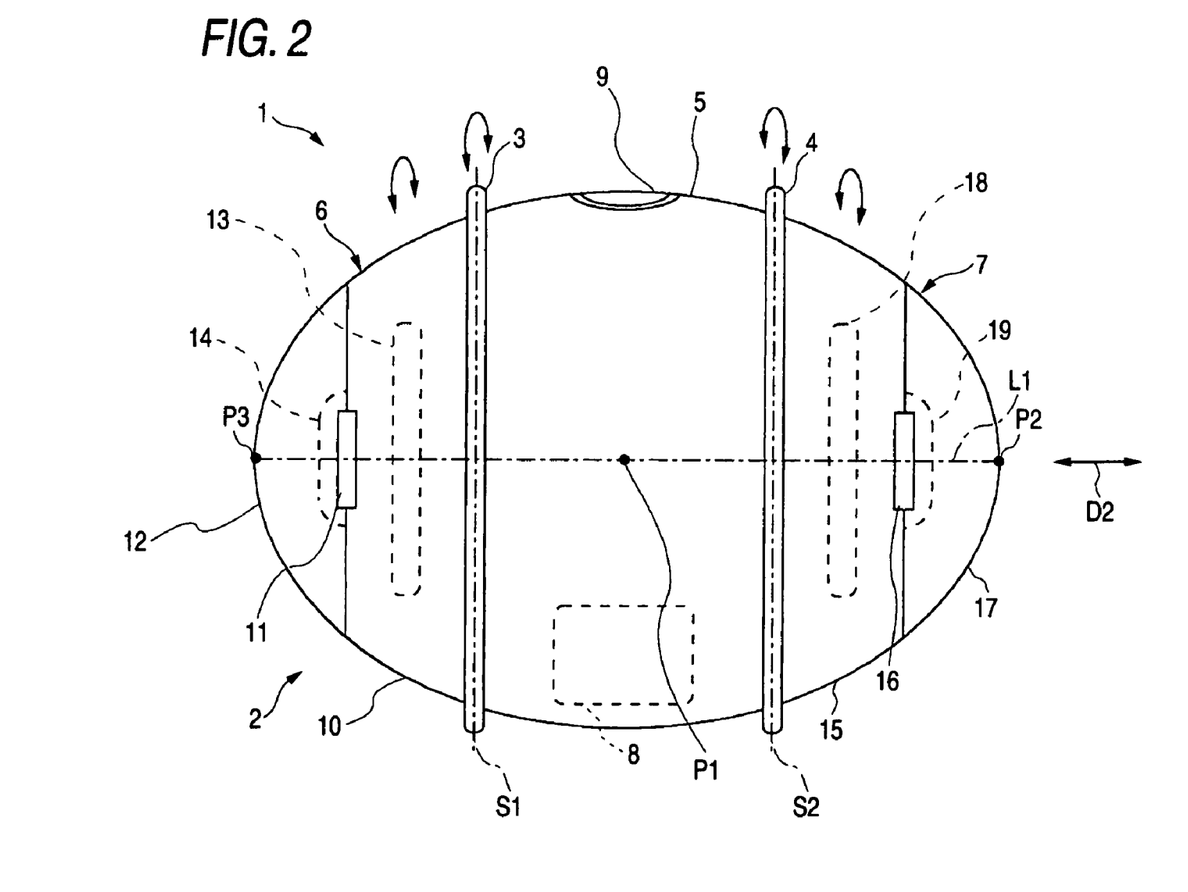
FIG. 2 shows a schematic diagram depicting the front configuration of the music reproduction robot apparatus.

As shown in FIG. 2, the music reproduction robot apparatus 1 has a left wheel 3 and a right wheel 4 configured to have the same annular shape which are protruded around the outer surface of the ellipsoidal case 2 on a left vertical plane S1 and a right vertical plane S2, the planes S1 and S2 are perpendicular with respect to a horizontal rotation axis L1 at the position equidistant from a center point P1, the axis L1 connects major axis end parts P2 and P3 of the ellipsoidal case 2 with a straight line. The left wheel 3 and the right wheel 4 are configured to rotate in an axial direction D1 of the horizontal rotation axis L1.

The ellipsoidal case 2 is further split into a center case 5 which is disposed between the left wheel 3 and the right wheel 4, a left case 6 which is disposed on the left side of the center case 5 and shrinks from the center case 5 toward the left end part P3, and a right case 7 which is disposed on the right side of the center case 5 and shrinks from the center case 5 toward the right end part P2.

Figure 3:
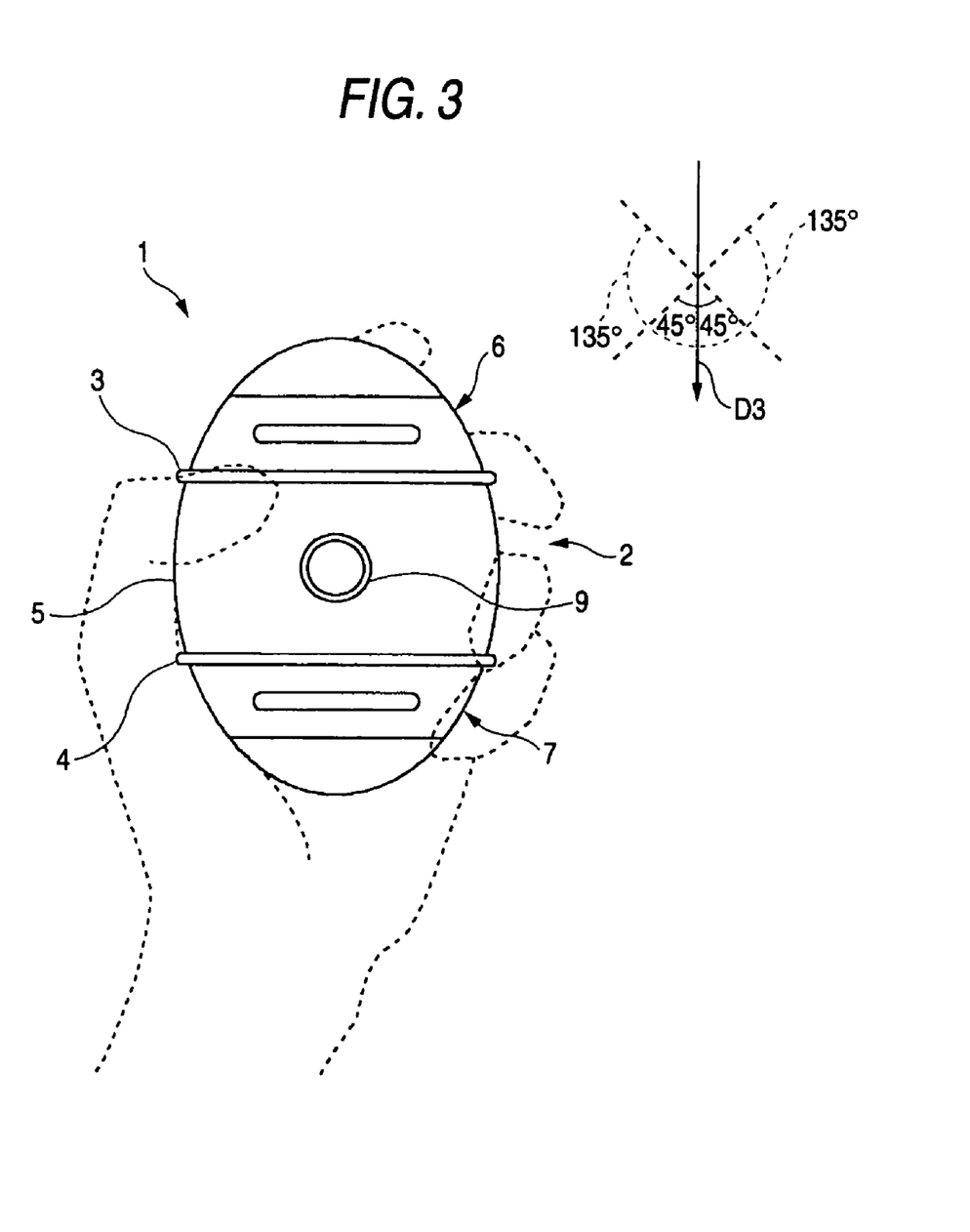
FIG. 3 shows a schematic diagram depicting the top configuration of the music reproduction robot apparatus.

The center case 5 has a weight 8 on the lower side thereinside which stabilizes the attitude of the center case 5 (more specifically, the center case 5 is prevented from rotating in the axial direction D1 of the horizontal rotation axis L1). On the surface of the center case 5, a touch sensing part 9 is disposed which senses the touch of a user's finger or hand, as shown in FIG. 3.

The left case 6 has a left rotating body 10 which is rotatable in the axial direction D1 of the horizontal rotation axis L1 with respect to the center case 5, and a left cover 12 which is disposed on the left side of the left rotating body 10 through a hinge 11 as openable left outward. The left rotating body 10 has a light emitting part 13 on the surface thereof, the part 13 has a light emitting module such as an LED (Light Emitting Diode). The left cover 12 has a speaker 14 thereinside in which the speaker 14 is exposed outside when the cover opens left outward through the hinge 11, as shown in FIG. 1B.

Similarly, the right case 7 has a right rotating body 15 which is rotatable in the axial direction D1 of the horizontal rotation axis L1 with respect to the center case 5, and a right cover 17 which is disposed on the right side of the right rotating body 15 through a hinge 16 as openable right outward. On the surface of the right rotating body 15, a light emitting part 18 is disposed. The right cover 17 has a speaker 19 thereinside in which the speaker 19 is exposed outside when the cover opens right outward through the hinge 16, as shown in FIG. 1B.

Figure 4:
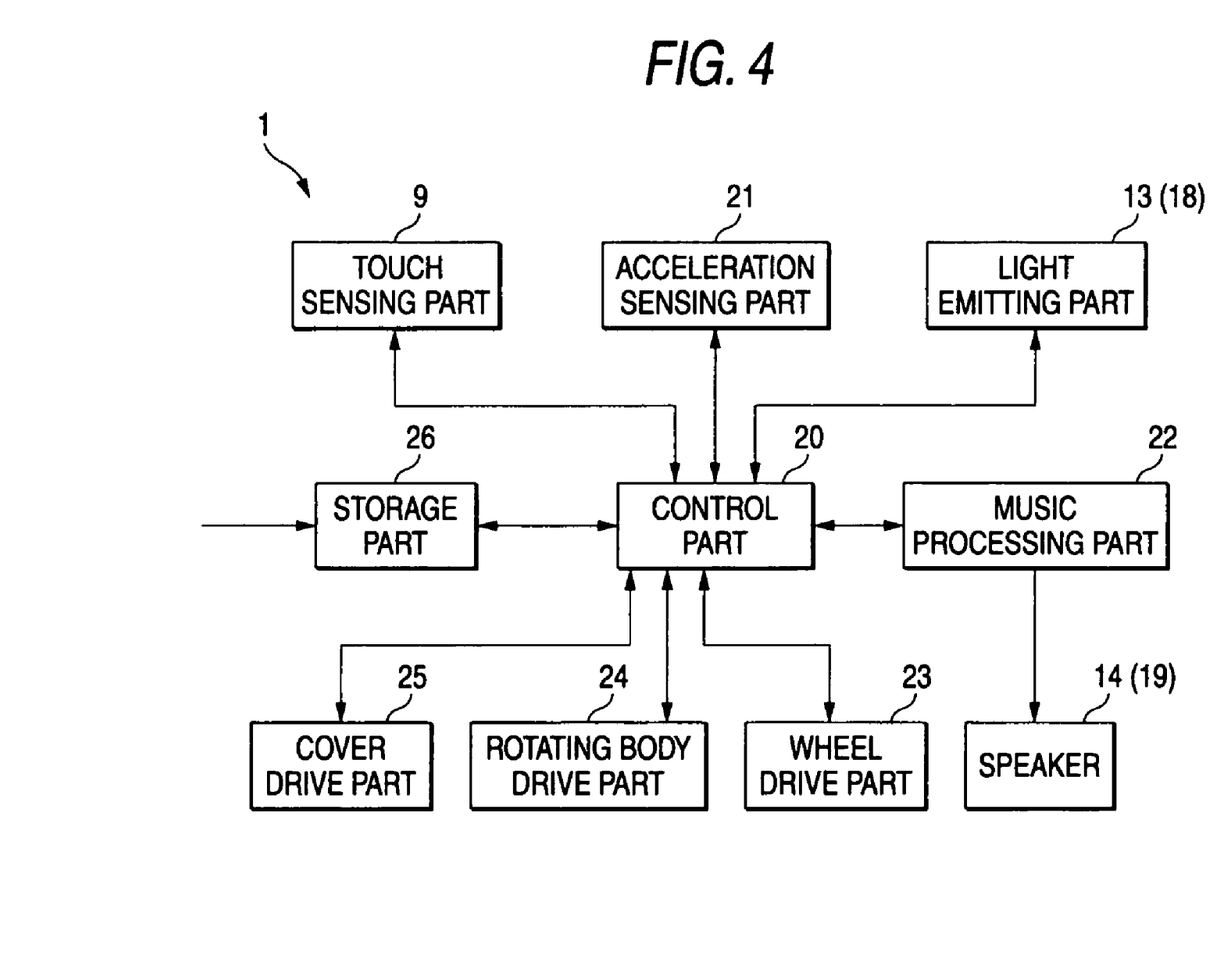
FIG. 4 shows a schematic diagram depicting the circuit configuration of the music reproduction robot apparatus.

Next, the circuit configuration of the music reproduction robot apparatus 1 will be described with reference to FIG. 4. The music reproduction robot apparatus 1 has a control part 20 which generally controls the entire apparatus and to which each part of the apparatus is connected. The control part 20 is configured to control various operations of the music reproduction robot apparatus 1 in which a CPU (Central Processing Unit) is connected with a RAM (Random Access Memory), a ROM (Read Only Memory), a clock circuit and other devices, and the CPU reads various control programs stored in the ROM and runs them on the RAM.

The control part 20 senses that the music reproduction robot apparatus 1 is lifted from a floor, for example, through an acceleration sensing part 21, senses that a user's finger or hand touches on the touch sensing part 9 disposed on the surface of the center case 5, and senses that the ellipsoidal case 2 is shaken at an acceleration of a predetermined value or greater through the acceleration sensing part 21. Then, it performs a shaking direction determination process which determines the direction to shake the ellipsoidal case 2.

For example, in the shaking direction determination process, when the control part 20 recognizes that the direction to shake the case is the direction to instruct reproduction of music by the acceleration sensing part 21, it determines that a reproduction control instruction to reproduce music is inputted.

Accordingly, the control part 20 reads music data stored in a storage part 26, and outputs music (reproduces music) based on the read music data sequentially through a music processing part 22 and the speakers 14 and 19. In this manner, the music reproduction robot apparatus 1 can conduct a music reproduction process which outputs music from the speakers 14 and 19 based on music data stored in the storage part 26.

Subsequently, when the control part 20 senses that the ellipsoidal case 2 is placed on a floor as both of the left wheel 3 and the right wheel 4 contact with the floor by the acceleration sensing part 21, it performs a tune reproduction motion process which operates each part of the ellipsoidal case 2 depending on a tune of music being reproduced (tempo, pitch, etc.).

In other words, in the tune reproduction motion process, the control part 20 controls a wheel drive part 23 depending on a tune of music being reproduced, whereby the left wheel 3 and the right wheel 4 configured in the same annular shape are rotated and driven in the axial direction D1 of the horizontal rotation axis L1. Thus, the music reproduction robot apparatus 1 can stably run on a floor, for example, in synchronization with a tune of music outputted from the speakers 14 and 19.

In addition, in the tune reproduction motion process, the control part 20 controls a rotating body drive part 24 depending on a tune of music under the music reproduction process, whereby the left rotating body 10 and the right rotating body 15 are rotated and driven, and thus the left case 6 and the right case 7 are rotated in the axial direction D1 of the horizontal rotation axis L1, the left case 6 configured to shrink toward the horizontal rotation axis L1 as closer from the center case 5 to the left end and the right case 7 configured to shrink toward the horizontal rotation axis L1 as closer from the center case 5 to the right end. Therefore, the music reproduction robot apparatus 1 can rotate the left case 6 and the right case 7 in synchronization with a tune of music outputted from the speakers 14 and 19 with no hindrance to the left wheel 3 and the right wheel 4 from running.

Moreover, in the tune reproduction motion process, the control part 20 controls a cover drive part 25 depending on a tune of music under the music reproduction process, whereby the left cover 12 and the right cover 17 are openably operated left outward and right outward. Therefore, the music reproduction robot apparatus 1 can open and close the left cover 12 and the right cover 17 in synchronization with a tune of music outputted from the speakers 14 and 19.

Moreover, in the tune reproduction motion process, the control part 20 emits light through the light emitting parts 13 and 18 depending on a tune of music under the music reproduction process. Therefore, the music reproduction robot apparatus 1 can emit light in synchronization with a tune of music outputted from the speakers 14 and 19.

Accordingly, the music reproduction robot apparatus 1 can operate as though it dances on a floor, for example, depending on a tune of music being reproduced, and consequently, entertainment value can be improved significantly.

Figure 5:
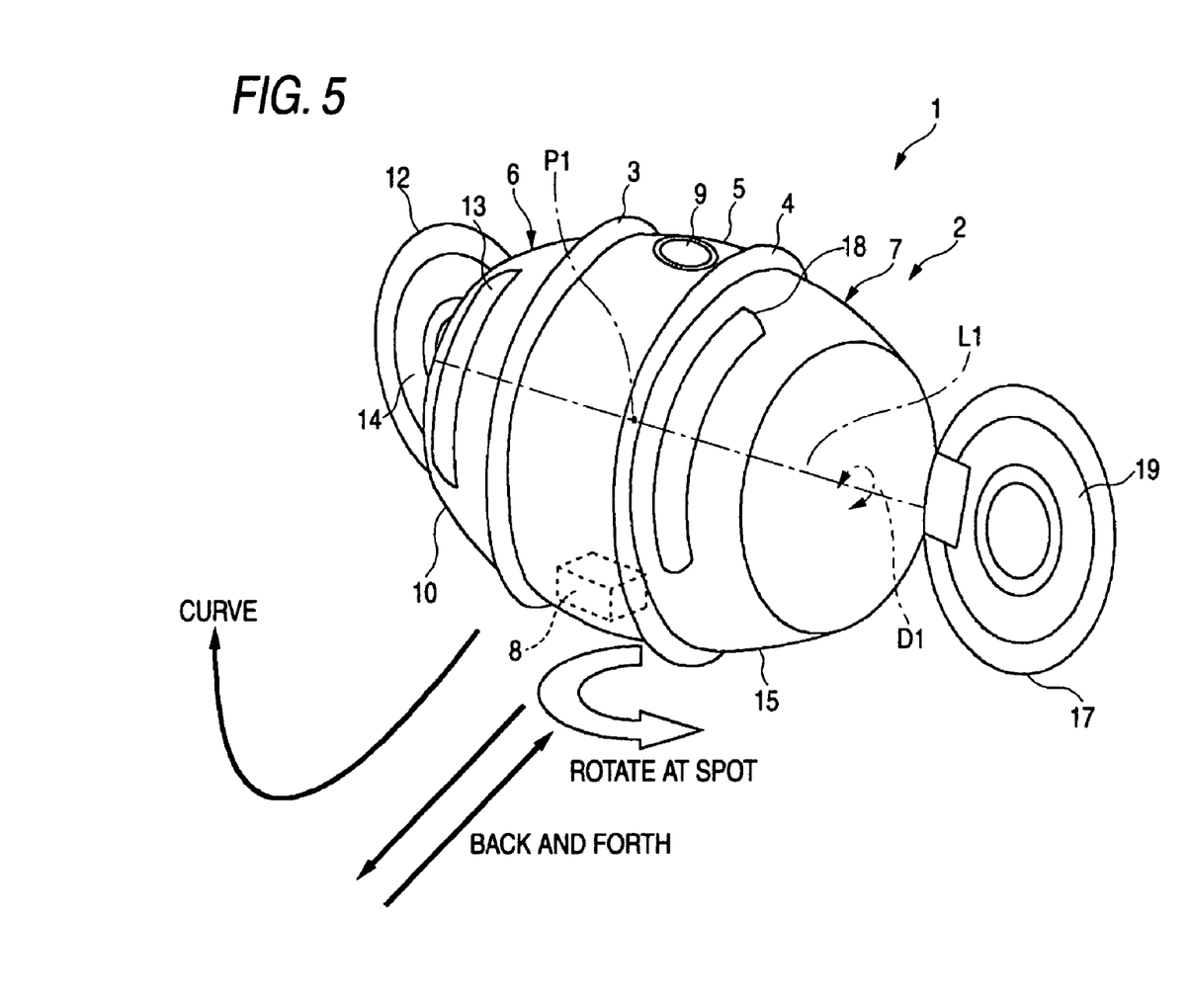
FIG. 5 shows a schematic diagram depicting the music reproduction robot apparatus how it runs.

In the case of the embodiment, for example, as shown in FIG. 5, the music reproduction robot apparatus 1 can rotate at the spot, run as it draws a curve, or move in a straight line the back-and-forth direction depending on a tune of music being reproduced (reproduced tune).

For example, when the music reproduction robot apparatus 1 rotates at the spot, the control part 20 controls the wheel drive part 23 to rotate and drive the left wheel 3 and the right wheel 4 in the opposite directions to each other with the same force. In addition, when the apparatus runs as it draws a curve, the control part 20 controls the wheel drive part 23 to rotate and drive the left wheel 3 and the right wheel 4 in the same direction with different forces. In addition, when the apparatus moves in a straight line in the back-and-forth direction, the control part 20 controls the wheel drive part 23 to rotate and drive the left wheel 3 and the right wheel 4 in the same direction with the same force.

As described above, in the music reproduction robot apparatus 1 according to an embodiment of the invention, depending on a tune of music being reproduced, various operations are performed such as the run in back and forth and right and left directions by rotating the left wheel 3 and the right wheel 4, the open and close operations of the left cover 12 and the right cover 17, and the light emission of the light emitting parts 13 and 18 (these are collectively called a motion), whereby music reproduction is performed with abundant entertainment value.

2. Tune Reproduction Motion Process

Figure 6:
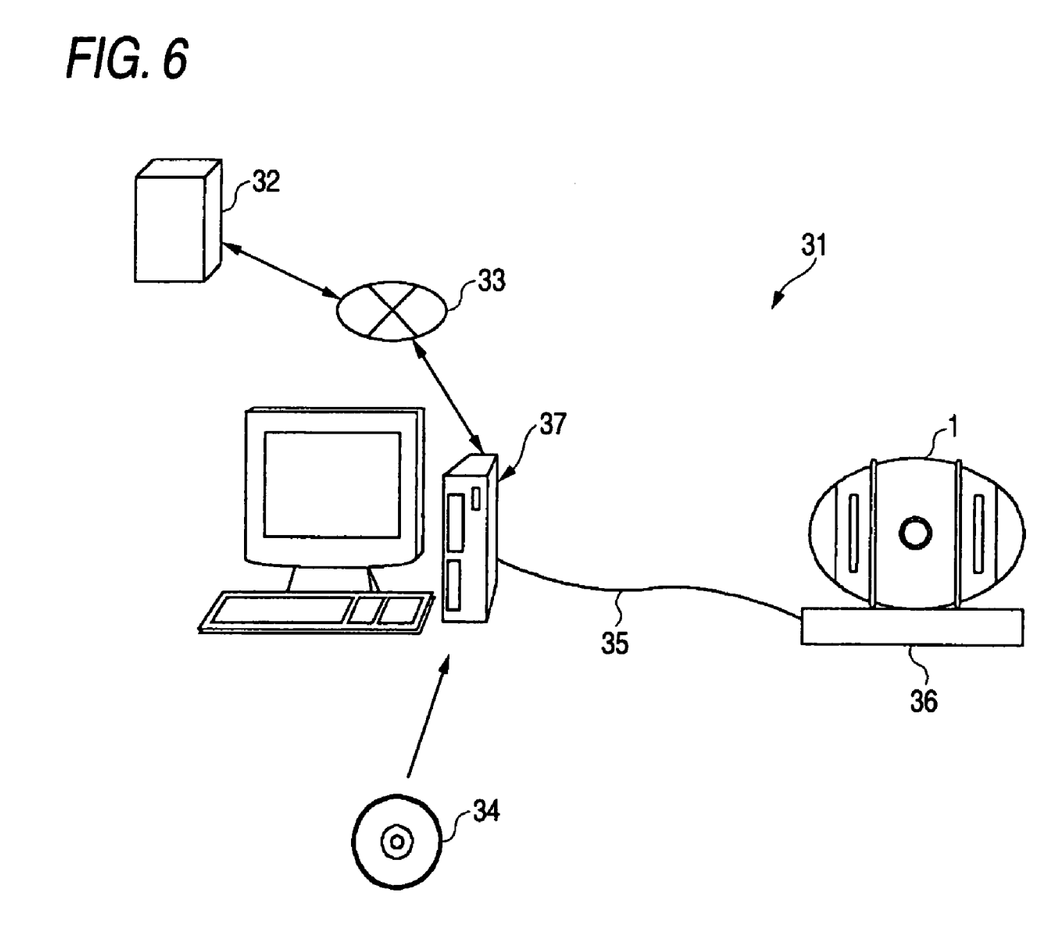
FIG. 6 shows a schematic diagram depicting the configuration of a music data transfer system.

Here, a music data transfer system 31 shown in FIG. 6 has a transfer unit 37 which transfers music data acquired from a music data providing server 32 which offers music data through a network 33 or music data acquired from a recording medium (for example, CD (Compact Disc)) 34 on which music data is recorded to the music reproduction robot apparatus 1 through a USB (Universal Serial Bus) cable 35 and a cradle 36 on which the music reproduction robot apparatus 1 is placed, for example. In the case of the embodiment, the transfer unit 37 corresponds to a personal computer etc.

Figure 7:
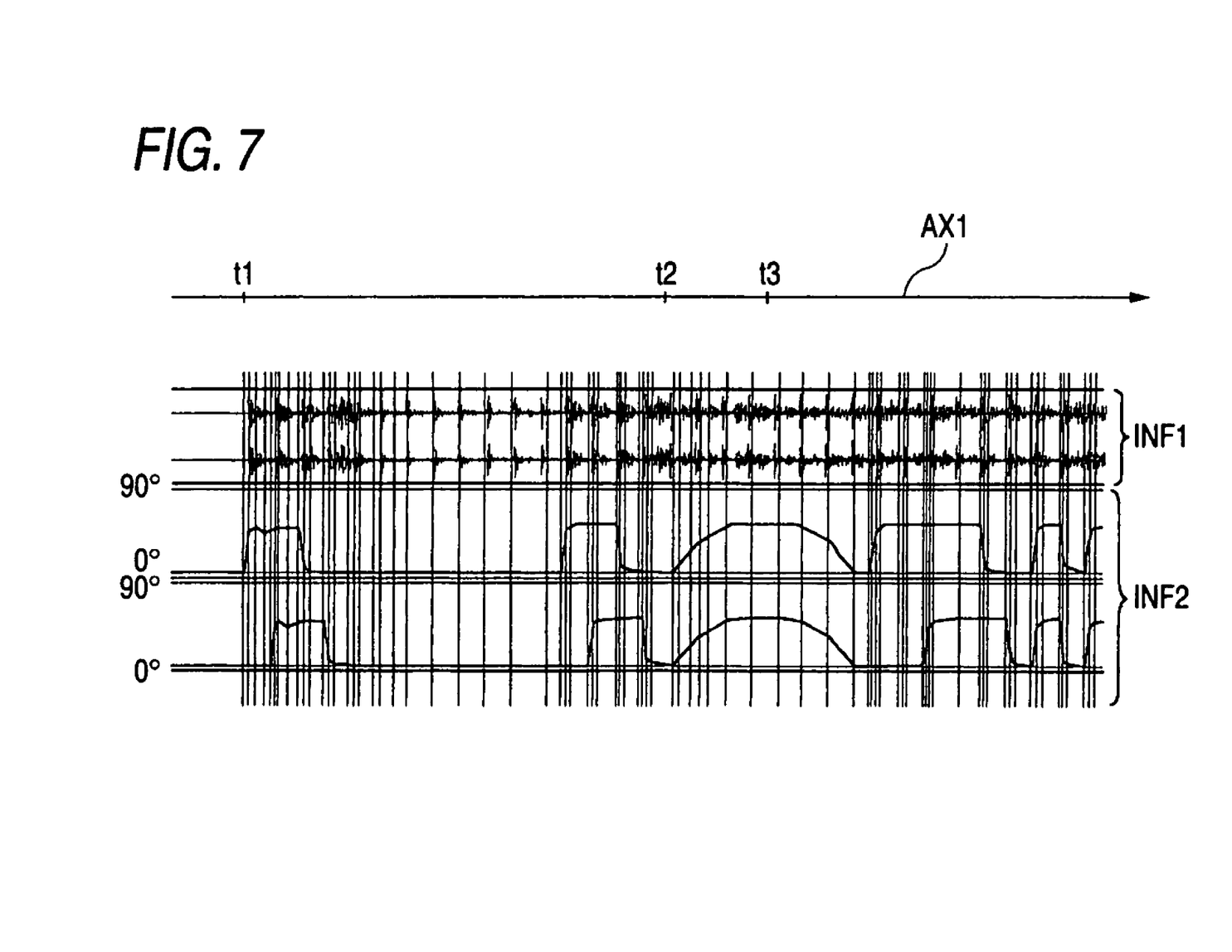
FIG. 7 shows a schematic diagram depicting music analysis result information and drive part motion information.

The transfer unit 37 performs a frequency analysis process, for example, for music data before it supplies the music data to the music reproduction robot apparatus 1. For example, as shown in FIG. 7, the transfer unit 37 can acquire music analysis result information INF1 which describes the frequency analysis result of the music data along a reproduction time base AX1.

Subsequently, based on the acquired music analysis result information INF1, the transfer unit 37 creates drive part motion information INF2 which describes information including the rotational direction and the rotation speed of the left wheel 3 and the right wheel 4, the rotational direction and the rotation angle of the left rotating body 10 and the right rotating body 15, open and close angles that open and close the left cover 12 and the right cover 17, and the timing to allow the light emitting parts 13 and 18 to emit light, along the reproduction time base AX1. Thus, the transfer unit 37 can acquire the drive part motion information INF2 which operates the drive parts (3, 4, 12, 17, 10 and 15) depending on a tune of the music data. The drive part motion information INF2 shown in FIG. 7 describes the open and close angles that open and close the left cover 12 and the right cover 17 along the reproduction time base AX1 of music data.

Then, when a transfer manipulation is done by a user, for example, the transfer unit 37 transfers such music data and the drive part motion information INF2 associated with the music data to the music reproduction robot apparatus 1 through the USB cable 35 and the cradle 36. At this time, the control part 20 of the music reproduction robot apparatus 1 is configured to store music data and the drive part motion information INF2 from the transfer unit 37 in the storage part 26.

Consequently, the control part 20 of the music reproduction robot apparatus 1 can conduct the tune reproduction motion process which moves the drive parts (3, 4, 12, 17, 10 and 15) based on the drive part motion information INF2 associated with the music data while music data stored in the storage part 26 is under the music reproduction process.

Figure 8:
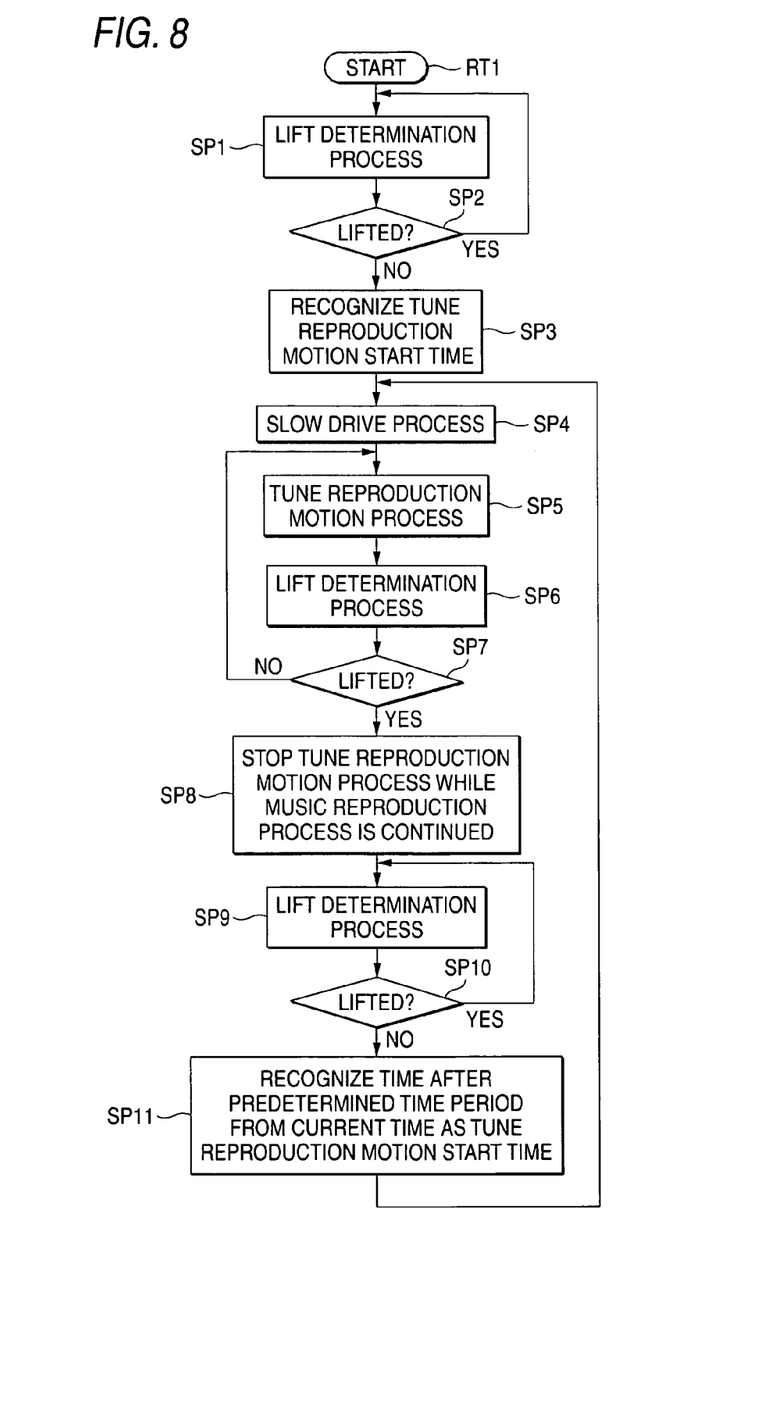
FIG. 8 shows a flow chart depicting a tune reproduction motion control process procedure.

Next, with reference to a flow chart shown in FIG. 8, a tune reproduction motion control process procedure RT1 will be described, which performs control such as starting or terminating the tune reproduction motion process.

For example, the control part 20 of the music reproduction robot apparatus 1 goes to Step SP1 in response to an entry of a reproduction control instruction to instruct reproduction of music, and it conducts a lift determination process which determines whether the ellipsoidal case 2 is lifted from a floor.

Subsequently, when the control part 20 recognizes that the ellipsoidal case 2 is placed on the floor as both of the left wheel 3 and the right wheel 4 contact with the floor in consequence of the lift determination process, for example, it acquires a negative result at Step SP2, and goes to Step SP3.

At Step SP3, in response to the inputted reproduction control instruction, the control part 20 recognizes a time t1 on the reproduction time base AX1 to start the music reproduction process as a tune reproduction motion start time t1 to start the tune reproduction motion process, and then it goes to Step SP4 to conduct a slow drive process.

In the slow drive process, the control part 20 references to the drive part motion information INF2 at the recognized tune reproduction motion start time t1, and compares the open and close angles of the left cover 12 and the right cover 17 described in the referenced drive part motion information INF2 with the open and close angles of the current positions at which the left cover 12 and the right cover 17 are currently located. Consequently, when the difference between the open and close angles described in the drive part motion information INF2 and the open and close angles at the current positions is smaller than a predetermined value, the control part 20 determines that an excessive load is not applied around the left cover 12 and the right cover 17 in the case in which the covers are abruptly opened and closed from the current positions to the open and close angles described in the drive part motion information INF2. In addition, in the slow drive process, the control part 20 references to drive part motion information INF2 at the tune reproduction motion start time t1, and compares the rotation angles of the left rotating body 10 and the right rotating body 15 described in the referenced drive part motion information INF2 with the rotation angles of the current positions at which the left rotating body 10 and the right rotating body 15 are currently located. Consequently, when the difference between the rotation angles described in the drive part motion information INF2 and the rotation angles of the current positions is smaller than a predetermined value, the control part 20 determines that an excessive load is not applied around the left rotating body 10 and the right rotating body 15 in the case in which the bodies are abruptly rotated. In this case, the control part 20 goes to Step SP5 with nothing further done.

Then, at Step SP5, the control part 20 starts to conduct the tune reproduction motion process at the recognized tune reproduction motion start time t1.

Thus, the music reproduction robot apparatus 1 can conduct the tune reproduction motion process that moves the drive parts (3, 4, 12, 17, 10 and 15) in synchronization with a tune of music under the music reproduction process.

Subsequently, the control part 20 goes to Step SP6, and it again conducts the lift determination process that determines whether the ellipsoidal case 2 is lifted from the floor. Here, in consequence of the lift determination process, when the control part 20 recognizes that the ellipsoidal case 2 is placed on the floor as both of the left wheel 3 and the right wheel 4 contact with the floor, it acquires a negative result at Step SP7, returns to Step SP5 above, and continues to conduct the tune reproduction motion process. On the other hand, in consequence of the lift determination process, when the control part 20 recognizes that the ellipsoidal case 2 is lifted from the floor, it acquires a positive result at Step SP7, and goes to Step SP8.

At Step SP8, the control part 20 ends the tune reproduction motion process while the music reproduction process is kept running. Therefore, the drive parts (3, 4, 12, 17, 10 and 15) disposed on the ellipsoidal case 2 stop moving, and thus such an event can be prevented that a user holding the ellipsoidal case 2 might drop the ellipsoidal case 2.

Subsequently, the control part 20 goes to Step SP9, and it again conducts the lift determination process that determines whether the ellipsoidal case 2 is lifted from the floor. Here, in consequence of the lift determination process, when the control part 20 recognizes that the ellipsoidal case 2 is lifted from the floor, it acquires a positive result at Step SP10, returns to Step SP9 above, and continues to conduct the music reproduction process while the tune reproduction motion process is kept stopped. On the other hand, in consequence of the lift determination process, when the control part 20 recognizes that the ellipsoidal case 2 is placed on the floor as both of the left wheel 3 and the right wheel 4 contact with the floor, it acquires a negative result at Step SP10, and goes to Step SP11.

At Step SP11, the control part 20 recognizes a time t3 as a tune reproduction motion start time t3 that again starts the tune reproduction motion process after a predetermined time period (for example, 10 seconds) has elapsed from the current time t2 on the reproduction time base AX1, and then it returns to Step SP4 above to conduct the slow drive process.

In the slow drive process, the control part 20 references to drive part motion information INF2 at the recognized tune reproduction motion start time t3, and compares the open and close angles of the left cover 12 and the right cover 17 described in the referenced drive part motion information INF2 with the open and close angles of the current positions at which the left cover 12 and the right cover 17 are currently located. Consequently, when it recognizes that the difference between the open and close angles described in the drive part motion information INF2 and the open and close angles of the current positions is equal to or greater than a predetermined threshold of angle difference, it determines that an excessive load is applied around the left cover 12 and the right cover 17 in the case in which the covers are abruptly opened and closed from the current positions to the open and close angles described in the drive part motion information INF2. It allows the left cover 12 and the right cover 17 to open and close at a slow speed as close to the open and close angles described in the drive part motion information INF2. In addition, in the slow drive process, the control part 20 references to the drive part motion information INF2 at the tune reproduction motion start time t3, and compares the rotation angles of the left rotating body 10 and the right rotating body 15 described in the referenced drive part motion information INF2 with the rotation angles of the current positions at which the left rotating body 10 and the right rotating body 15 are currently located. Consequently, when the difference between the rotation angles described in the drive part motion information INF2 and the rotation angles of the current positions is equal to or greater than a predetermined threshold of angle difference, it determines that an excessive load is applied around the left rotating body 10 and the right rotating body 15 in the case in which the bodies are rotated abruptly. It allows the left rotating body 10 and the right rotating body 15 to rotate at a slow speed as close to the rotation angles described in the drive part motion information INF2. Therefore, according to the music reproduction robot apparatus 1, the tune reproduction motion process can be started again with no excessive load applied to the drive parts (12, 17, 10 and 15).

After conducting the slow drive process, the control part 20 goes to Step SP5, and again starts to conduct the tune reproduction motion process at the recognized tune reproduction motion start time t3.

As described above, according to the music reproduction robot apparatus 1, when the ellipsoidal case 2 is again placed on the floor as both of the left wheel 3 and the right wheel 4 contact with the floor, the drive parts (3, 4, 12, 17, 10 and 15) can be again started to move in synchronization with a tune of music kept on reproduction.

3. Reproduction Mode Changing Process

The music reproduction robot apparatus 1 has two types of reproduction modes as music reproduction modes: a normal reproduction mode which reproduces music data stored in the storage part 26 in stored order, and a recommend mode which the music reproduction robot apparatus 1 itself selects and reproduces a recommended piece of music among the items of music data stored in the storage part 26.

For a method of selecting a recommended piece of music in the recommend mode, for example, this scheme can be considered to learn the tendency of tastes (genres, a tempo of music, etc.) of music data reproduced by a user on the music reproduction robot apparatus 1 and to select music data close to the tendency of tastes as a recommended piece of music.

The music reproduction robot apparatus 1 is set to the normal reproduction mode in the initial state (factory shipment state). Then, in the shaking direction determination process, when the control part 20 of the music reproduction robot apparatus 1 recognizes that the direction to shake the case by a user is the direction to instruct changing the reproduction mode (the shaking manipulation is called a mode changing manipulation), it changes the mode from the normal reproduction mode to the recommend mode in accordance with the manipulation. Moreover, when the control part 20 recognizes the mode changing manipulation by a user in the recommend mode, it changes the mode from the recommend mode to the normal reproduction mode in accordance with the manipulation. Therefore, the user moves the entire music reproduction robot apparatus 1 in the case shaking direction, whereby the reproduction mode can be changed freely.

In addition to the configuration like this, the music reproduction robot apparatus 1 is configured to automatically change the reproduction mode when a predetermined recommend mode changing condition is satisfied. For the recommend mode changing condition, three conditions are set: 1) recommend mode time frame, 2) continuous skipping manipulation, and 3) end an album. In addition, the music reproduction robot apparatus 1 is configured in which a user can select the automatic change function of the reproduction mode to be "valid" (to do automatic change) or to be "invalid" (not to do automatic change) by the case shaking manipulation.

1) The recommend mode time frame automatically changes the mode to the recommend mode in a predetermined time frame or a shift time frame set by a user beforehand. For example, it can be considered that a specific time frame (10 to 12 o'clock at night during which a user is relaxed, for example) is set as the shift time frame depending on a user's daily life pattern. Then, when the shift time frame is passed, the mode returns to the normal reproduction mode.

At this time, for the contents to be selected as a recommended piece of music, the contents suited for the recommend mode time frame may be selected. More specifically, each of the contents has information such as a genre, a tempo and a mood as additional data. The music reproduction robot apparatus 1 selects and reproduces the contents suited for the recommend mode time frame as a recommended piece of music based on the additional data. For example, it can be considered to select the contents having a slow tempo when the time frame set as the recommend mode time frame is night, or to select rock music as a genre when the set time frame is morning.

2) "The continuous skipping manipulation" automatically changes the mode to the recommend mode in the case in which a user is unsatisfied with pieces of music (for example, an album) when the skip manipulation (the manipulation that a number being reproduced is terminated to move to the next number) is continuously done for a predetermined number of times (for example, 10 times) within a predetermined time period (for example, a relatively short time period about five seconds) from the start time of a number (track) in the normal reproduction mode.

3) "End an album" automatically changes the mode to the recommend mode when the reproduction of the last number (the last track) of an album being reproduced is ended, or when all the numbers in an album are reproduced in shuffle reproduction.

Figure 9:
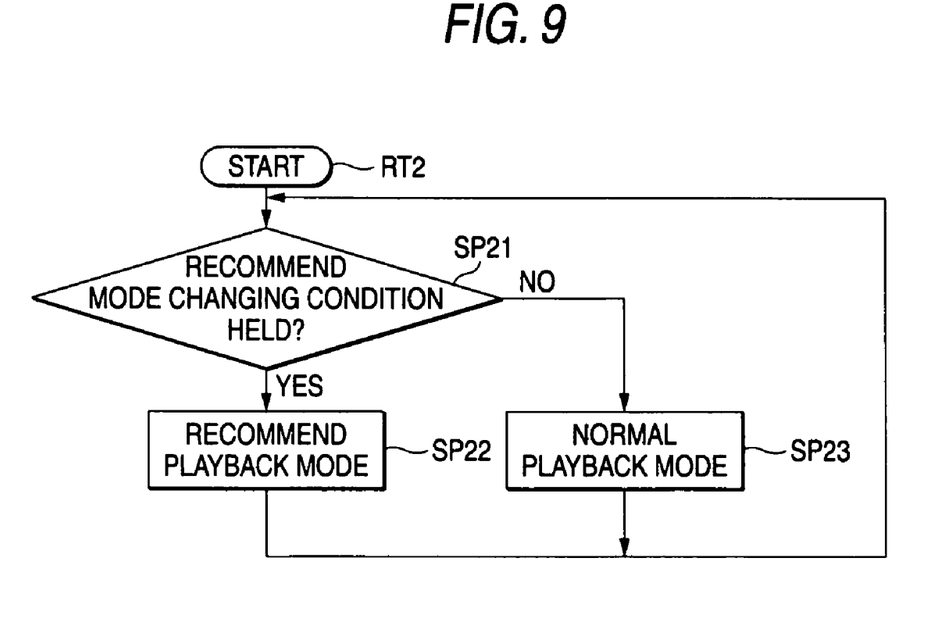
FIG. 9 shows a flow chart depicting a reproduction mode changing process procedure.

Next, with reference to a flow chart shown in FIG. 9, a reproduction mode changing process procedure will be described which automatically changes the reproduction mode.

When the automatic change function is set "valid", the control part 20 of the music reproduction robot apparatus 1 enters from the start step of the reproduction mode changing process procedure RT2, goes to Step SP21, and determines whether the recommend mode changing condition is satisfied.

At Step SP21, when a positive result is acquired, this means that at least one of conditions, "the recommend mode time frame", "the continuous skipping manipulation" or "end an album" is satisfied. At this time, the control part 20 goes to Step SP22, sets the reproduction mode to the recommend mode, and returns to Step SP21. On the other hand, at Step SP21, when a negative result is acquired, this means that none of the conditions, "the recommend mode time frame", "the continuous skipping manipulation" or "end an album" is satisfied. At this time, the control part 20 goes to Step SP23, sets the reproduction mode to the normal reproduction mode, and returns to Step SP21.

Therefore, the music reproduction robot apparatus 1 is configured to change the reproduction mode by user's intention as well as to automatically change the reproduction mode by the reproduction mode changing process procedure.

4. Change in the Motion Depending on the Reproduction Mode

In addition to the configuration like this, the music reproduction robot apparatus 1 provides differences in the motion between the normal reproduction mode and the recommend mode based on the tune reproduction motion process, whereby the reproduction mode being performed is notified to a user through the motion.

More specifically, there are two types of schemes: a first motion changing scheme in which drive part motion information INF2 for moving each of the drive parts (3, 4, 12, 17, 10 and 15) is changed in the recommend mode to create differences in the motion, and a second motion changing scheme in which the gain at which each of the drive parts (3, 4, 12, 17, 10 and 15) is moved is changed to create differences in the motion. The music reproduction robot apparatus 1 conducts the motion control by selecting or combining the schemes in the recommend mode. In addition, the selection or combination of the motion changing schemes may be defined by user preferences or may be autonomously defined by the music reproduction robot apparatus 1 depending on the external conditions.

Here, the motion control can be expressed as:

Voltage $V$ applied to a motor=gain×(target angle−current angle).

Where, "the target angle" corresponds to the value at each of the timing in drive part motion information INF2.

Figure 10:
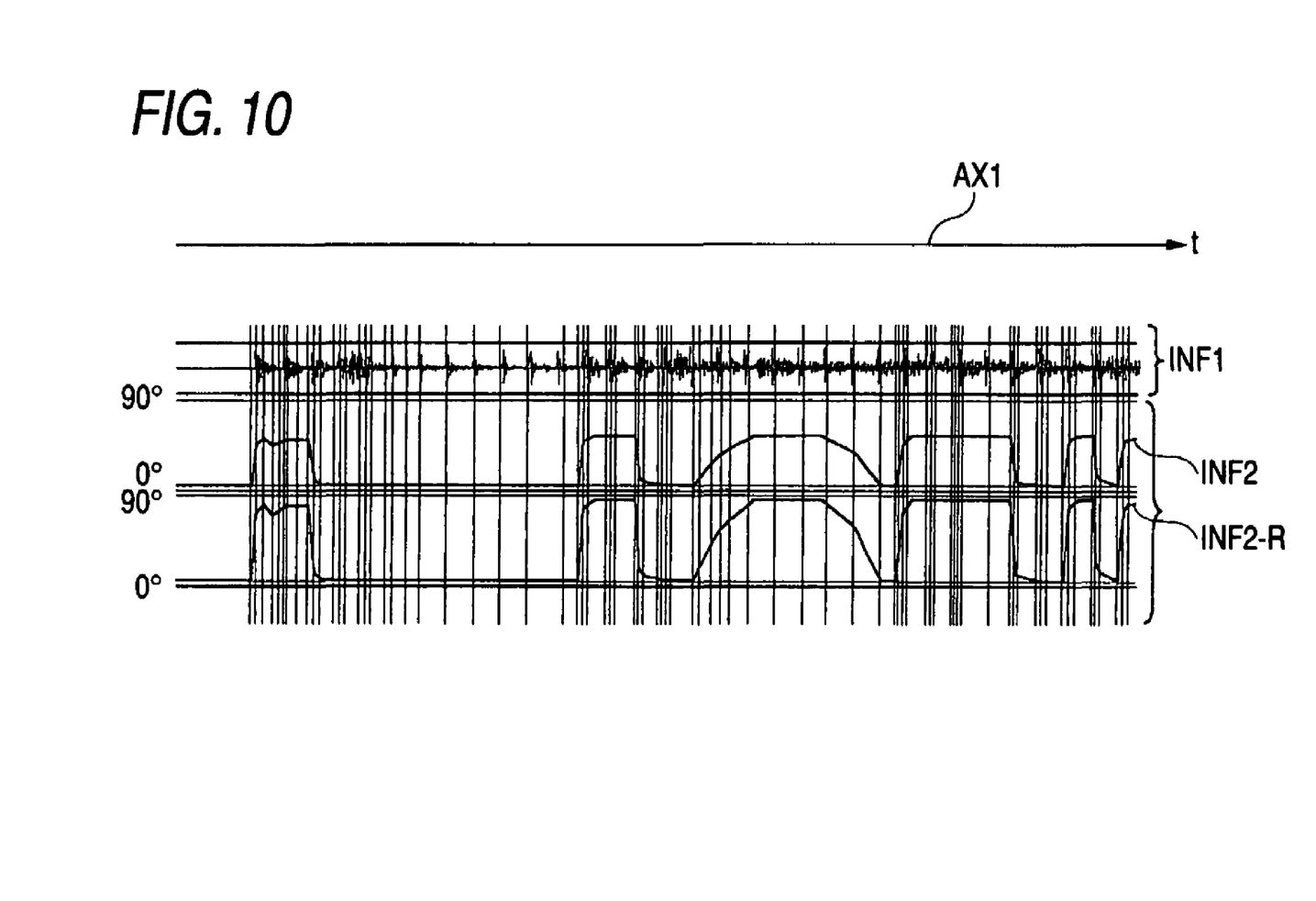
FIG. 10 shows a schematic diagram for illustrating drive part motion information.

First, the first motion changing scheme will be described. As shown in FIG. 10, in the recommend mode, the control part 20 of the music reproduction robot apparatus 1 creates recommend mode drive part motion information INF2-R which has an increase in the amplitude of drive part motion information INF2 created for the normal reproduction mode (that is, the target angle is increased), and allows each of the drive parts (3, 4, 12, 17, 10 and 15) to move based on the INF2-R. Thus, each of the drive parts (3, 4, 12, 17, 10 and 15) of the music reproduction robot apparatus 1 increases in the amplitude and the speed of the motion more than in the normal reproduction mode, whereby the music reproduction robot apparatus 1 moves with "agility".

On the other hand, in the second motion changing scheme, the control part 20 of the music reproduction robot apparatus 1 uses drive part motion information INF2 the same as that in the normal reproduction mode, but it increases the gain more than that in the normal reproduction mode. In this case, although the amplitude of the motion is the same as that in the normal reproduction mode, the speed of the motion is increased more than that in the normal reproduction mode, whereby the music reproduction robot apparatus 1 moves quickly with "agility".

As described above, in the recommend mode, the music reproduction robot apparatus 1 moves more quickly than in the normal reproduction mode, and can create an impression to a user as though the apparatus has a strong intention to move.

Figure 11:
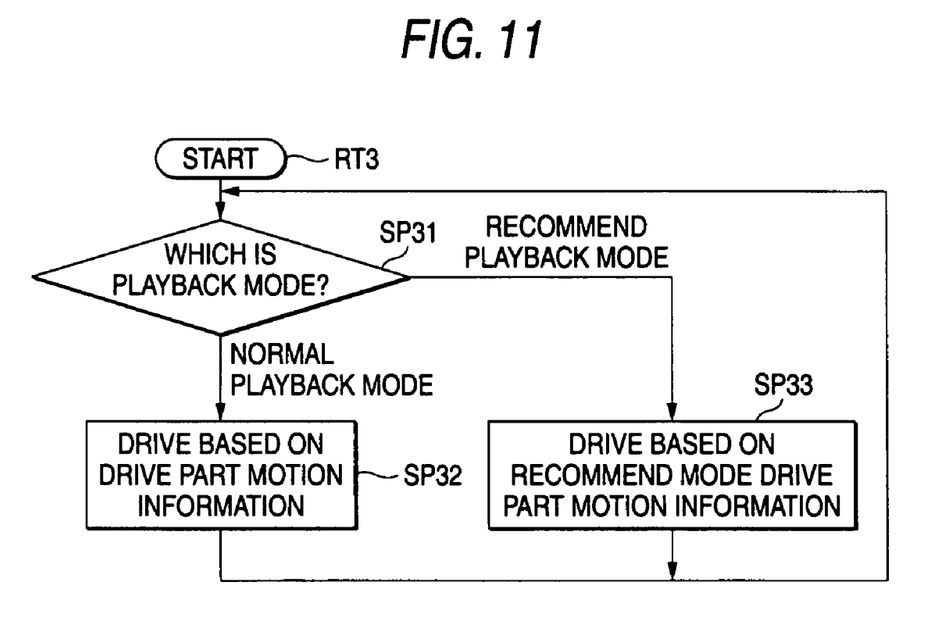
FIG. 11 shows a flow chart depicting a motion control process procedure.

Next, the motion control process which changes the reproduction mode depending on the motion will be described with reference to a flow chart shown in FIG. 11

The control part 20 of the music reproduction robot apparatus 1 enters from the start step of a motion control process procedure RT-3, goes to Step SP31, and confirms the current reproduction mode. At Step SP31, when the current reproduction mode is in the normal reproduction mode, the control part 20 goes to Step SP32, performs motion based on drive part motion information INF2, and returns to Step SP31.

On the other hand, at Step SP31, when the current reproduction mode is in the recommend reproduction mode, the control part 20 goes to Step SP33, creates recommend mode drive part motion information INF2-R from drive part motion information INF2, performs motion based on the INF2-R, and returns to Step SP31.

5. Operation and Advantage

In the configurations described above, in the recommend mode, the music reproduction robot apparatus 1 moves quickly more than in the normal reproduction mode by moving each of the drive part based on recommend mode drive part motion information INF2-R which has an increase in the amplitude more than that in normal reproduction mode drive part motion information INF2, or by moving each of the drive part by increasing the gain. Therefore, the music reproduction robot apparatus 1 can notify a user of the reproduction mode through the motion.

Moreover, the music reproduction robot apparatus 1 can create an impression to a user as though it moves at a strong intention through a quick motion, or an impression as though the apparatus recommends a recommended number to the user with this strong intention. Consequently, entertainment value can be improved significantly.

In addition to this, the music reproduction robot apparatus 1 automatically changes the reproduction mode to the recommend mode when the automatic change function of the reproduction mode is "valid", and any one of the recommend mode changing conditions is satisfied, "the recommend mode time frame", "the continuous skipping manipulation" or "end an album".

Accordingly, the music reproduction robot apparatus 1 operates as though it changes the mode at its intention not by user's manipulation. Consequently, entertainment value can be improved.

At this time, when a user performs "the continuous skipping manipulation" that the user continuously skips numbers, the music reproduction robot apparatus 1 automatically changes the mode to the recommend mode, whereby the apparatus can create an impression to the user as though the music reproduction robot apparatus 1 judges that the user is unsatisfied with these numbers and reproduces a number recommended by the apparatus. Consequently, entertainment value can be improved significantly.

According to the configurations, the apparatus is configured to shift to the recommend mode depending on the recommend mode changing condition satisfied. Thus, it can automatically change the reproduction mode depending on the conditions not by user's manipulation, and can create an impression to a user as though it changes the mode at its intention. Accordingly, the music reproduction robot apparatus 1 can be implemented which significantly improves entertainment value.

6. Other Embodiments

In addition, in the embodiment above, the case is described that the control part 20 conducts the tune reproduction motion control process procedure RT1, the reproduction mode changing process procedure RT2, and the motion control process procedure RT3 in software in accordance with a program installed in the music reproduction robot apparatus 1. However, an embodiment of the invention is not limited thereto, which may adapt this scheme in which a circuit that implements these processes is disposed on the music reproduction robot apparatus 1, and these processes are implemented in hardware by this circuit. In addition, a program that implements these processes may be recorded on a recording medium such as CD.

An embodiment of the invention can be adapted to a music reproduction apparatus, for example, which reproduces music based on music data.

It should be understood by those skilled in the art that various modifications combinations, sub-combinations and alterations may occur depending on design requirements and other factors insofar as they are within the scope of the appended claims or the equivalents thereof.

What is claimed is:

1. A reproduction apparatus comprising:
   a storage part which stores a plurality of items of contents data;
   reproduction means for reproducing contents in any one of reproduction modes including a normal reproduction mode that reads the contents data stored in the storage part in a predetermined order for reproduction, and a recommend mode that selects one part of the contents data stored in the storage part as a recommended piece of music for reproduction; and
   reproduction mode control means for changing the reproduction mode in the reproduction means to the recommend mode when a predetermined recommend mode changing condition is satisfied.

2. The reproduction apparatus according to claim 1, wherein in the normal reproduction mode, when a skip manipulation is done for a predetermined number of times or greater which stops reproduction of the contents being reproduced and reproduces next contents, the reproduction mode control means judges that the recommend mode changing condition is satisfied and changes the reproduction mode in the reproduction means to the recommend mode.

3. The reproduction apparatus according to claim 1, wherein when a current time is within a predetermined recommend mode shift time frame, the reproduction mode control means judges that the recommend mode changing condition is satisfied and changes the reproduction mode in the reproduction means to the recommend mode.

4. The reproduction apparatus according to claim 1, wherein in the normal reproduction mode, when last contents in a group of contents including contents being reproduced is finished, the reproduction mode control means judges that the recommend mode changing condition is satisfied and changes the reproduction mode in the reproduction means to the recommend mode.

5. A reproduction method of a reproduction apparatus comprising the steps of:
   reproducing contents in any one of reproduction modes:
      a normal reproduction mode that reads the contents data stored in a storage part in a predetermined order for reproduction, and
      a recommend mode that selects one part of the contents data stored in the storage part as a recommended piece of music for reproduction; and
   changing the reproduction mode in the reproducing step to the recommend mode when a predetermined recommend mode changing condition is satisfied.

6. A computer-readable storage medium including computer executable instructions, wherein the instructions, when executed by a processor, cause the processor to perform a reproduction method, the method comprising:

reproducing contents in any one of reproduction modes including a normal reproduction mode that reads the contents data stored in a storage part in a predetermined order for reproduction, and a recommend mode that selects one part of the contents data stored in the storage part as a recommended piece of music for reproduction; and changing the reproduction mode in the reproducing step to the recommend mode when a predetermined recommend mode changing condition is satisfied.

7. A reproduction apparatus comprising:

a storage part which stores a plurality of items of contents data;

a reproduction module which reproduces contents in any one of reproduction modes including a normal reproduction mode that reads the contents data stored in the storage part in a predetermined order for reproduction, and a recommend mode that selects one part of the contents data stored in the storage part as a recommended piece of music for reproduction; and a reproduction mode control module which changes the reproduction mode in the reproduction module to the recommend mode when a predetermined recommend mode changing condition is satisfied.

* * * * *